Oct. 16, 1923.

L. F. KNIGHT

METAL AIR CHECK VALVE

Filed Nov. 20, 1922

1,471,172

Inventor
Lewis F. Knight
By Shepherd & Campbell
Attorneys

Patented Oct. 16, 1923.

1,471,172

UNITED STATES PATENT OFFICE.

LEWIS F. KNIGHT, OF SIMPSON, KANSAS.

METAL AIR-CHECK VALVE.

Application filed November 20, 1922. Serial No. 602,315.

*To all whom it may concern:*

Be it known that I, LEWIS F. KNIGHT, a citizen of the United States, residing at Simpson, in the county of Mitchell and State of Kansas, have invented a new and useful Metal Air-Check Valve, of which the following is a specification.

This invention relates to an automatic all metal air check valve for use in connection with vehicle tires and it has for its object to provide an improved device of this character which will eliminate many of the difficulties experienced with valves of this character having rubber or cork seats or other parts.

Figure 1:
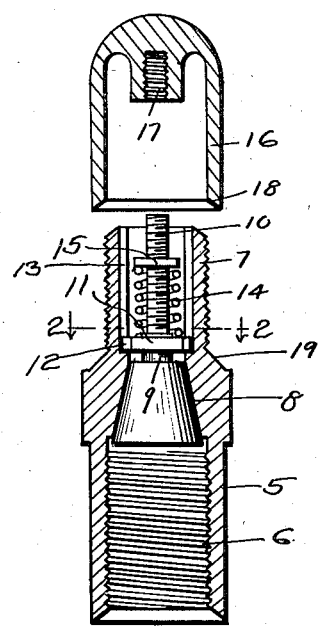
Figure 2:
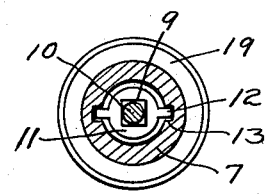

In the accompanying drawing:

Fig. 1 is a vertical sectional view of a check valve constructed in accordance with the invention; and Fig. 2 is a horizontal sectional view upon line 2—2 of Fig. 1.

Like numerals designate corresponding parts in both of the figures of the drawing.

In the drawing 5 designates a sleeve, internally threaded at 6 to adapt it to be threaded upon the usual valve extension or sleeve of the inner tube of a pneumatic tire. The sleeve 6 has a reduced and threaded part 7 to be engaged by a pump or other inflating medium. It is internally provided with upwardly tapering seat 8 adapted to coact with a metallic frusto conical valve 9. This valve is provided with a threaded stem 10 and has a squared part 11 which lies between the valve 9 and the stem 10. This squared part fits a correspondingly shaped opening formed in a washer-like element 11. This washer-like element is provided with laterally extending lugs 12 which fit in grooves 13 formed in the wall of the neck extension 7 of the body 5. A spring 14 bears between the washer-like element 11 and a nut 15 which is threaded upon the stem 10. A cap 16 has an internally threaded part 17 adapted to be screwed upon the upper end of the stem 10 and when its lower edge 18 engages with the correspondingly shaped shoulder 19 of the sleeve 5, the valve 9 is drawn snugly to a seating upon the seat 8. Thus the initial seating of the valve during the pumping action is under the influence of the spring, while the permanent seating of the valve after the pumping operation has been completed is under the action of the cap 16.

What I claim is:

An all metal auxiliary air valve for tires comprising in combination a casing internally threaded at its lower portion for engagement with the usual externally threaded valve tube of a pneumatic tire, and an upper end externally threaded for engagement with an air pump, a cap fitting over the said externally threaded upper end and carrying a centrally disposed internally threaded tubular member, a valve comprising a frusto, conical metallic body having an upwardly projecting threaded stem engageable by the internally threaded tubular member and an angular portion between the stem and body, a fixed element having an angular opening therethrough in which the said angular portion of the valve is engaged to prevent said valve from turning, a spring surrounding said valve stem, a member carried by the valve stem against which said spring bears to force said valve stem outwardly, and a valve seat integral with the casing and conforming in shape to the valve as and for the purposes set forth.

LEWIS F. KNIGHT